Patented May 19, 1936

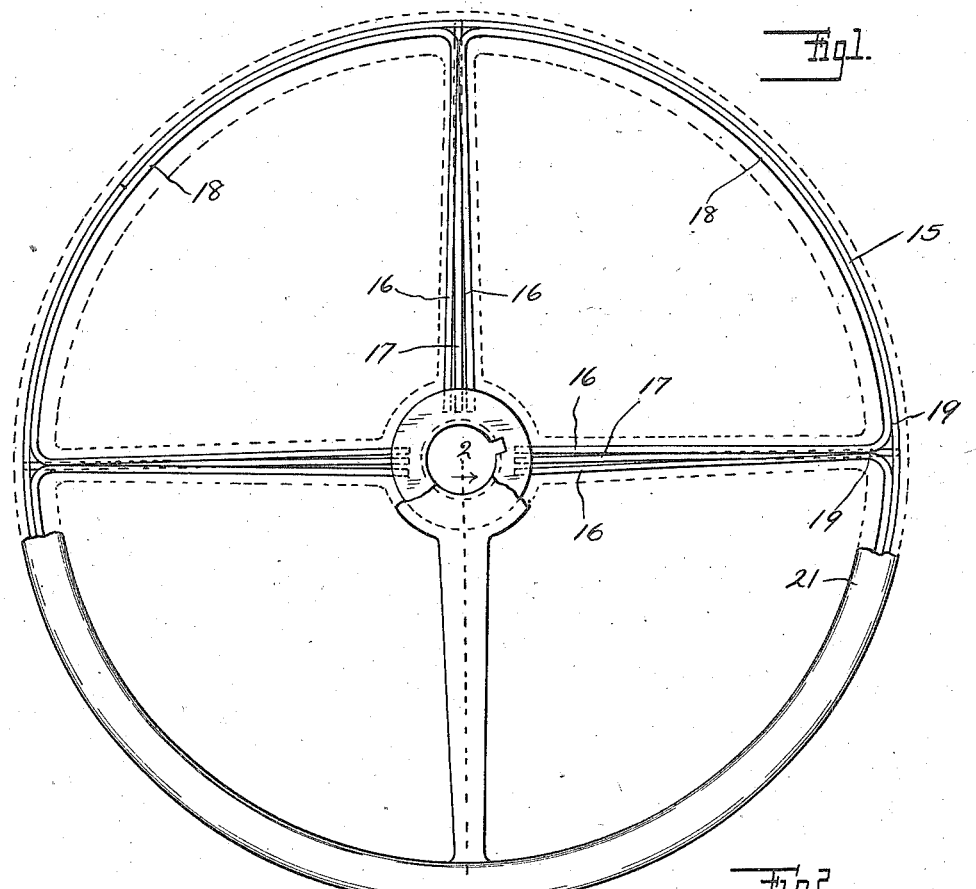
Fig. 1.
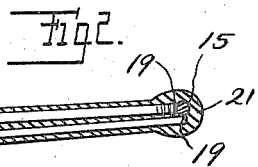
Fig. 2.
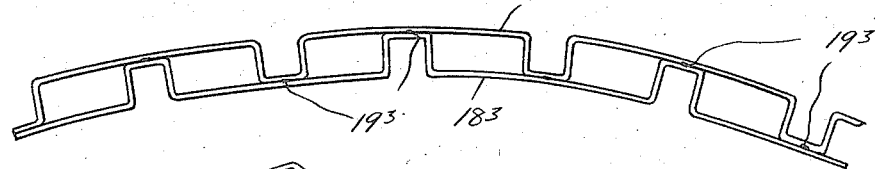
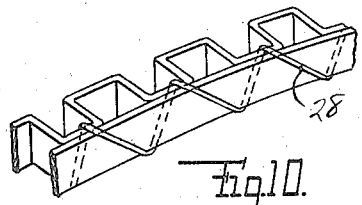
Fig. 7.
Fig. 10.
INVENTOR
Gregoire Joseph Pannecoucke
BY Swan & Frye
ATTORNEYS

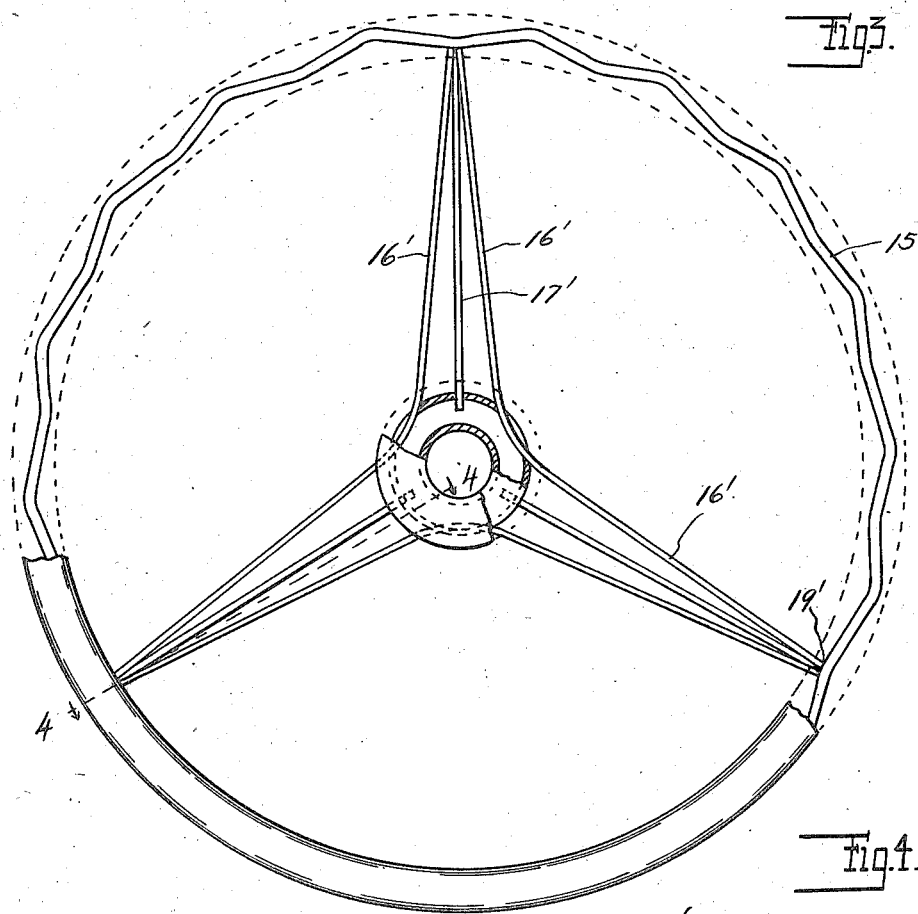
Fig. 3.
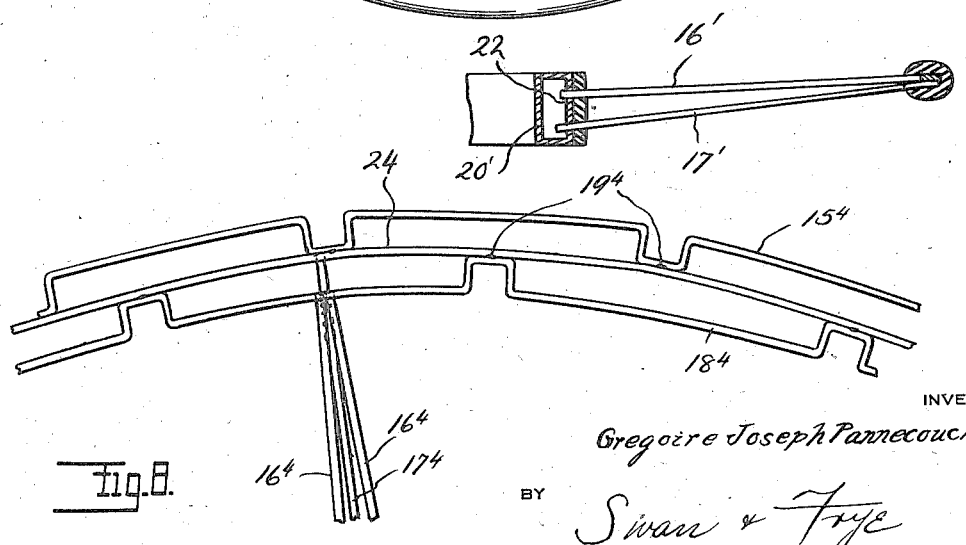
Fig. 4.
Fig. 8.
INVENTOR
Gregoire Joseph Pannecoucke
BY Swan & Frye
ATTORNEYS

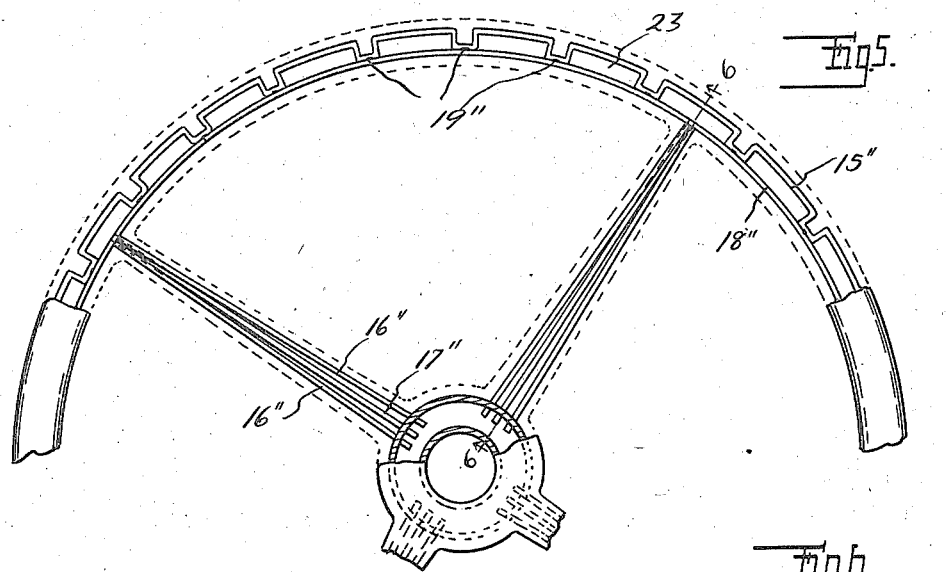
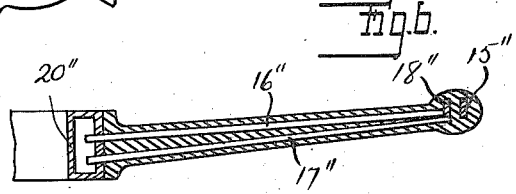
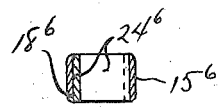
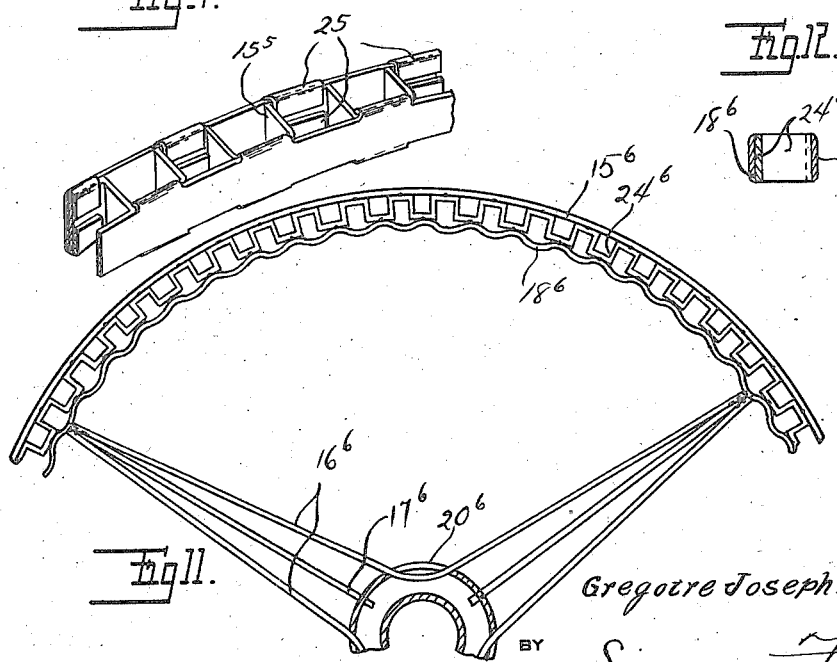

2,041,205

UNITED STATES PATENT OFFICE 2,041,205

REENFORCED STEERING WHEEL

Grégoire Joseph Pannecoucke, Detroit, Mich.

Application May 1, 1931, Serial No. 534,151

2 Claims. (Cl. 74—552)

This invention relates to the construction of reenforced steering wheels such as are used on automotive vehicles, and particularly to such steering wheels which are adapted to be covered with or partly constructed of a molded composition, although it will be shown subsequently herein that in certain forms my improved steering wheel may be used without any molded or other covering.

The invention has for one of its objects the provision of a steering wheel of great strength and pleasing appearance, but which is nevertheless of very inexpensive construction.

Another object of this invention is the provision of a steering wheel possessing all of the above named advantages but of very light weight.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a plan view showing one form of improved steering wheel embodying my invention, part of the molded composition surrounding the interior bracing framework being broken away to afford a view of the latter.

Figure 2 is a detail sectional view thereof taken substantially on the line 2—2 of Figure 1 and looking in the direction of the arrows.

Figure 3 is a view similar to Figure 1 of a somewhat modified form of steering wheel incorporating the principles of my invention.

Figure 4 is a detail sectional view thereof taken substantially on the line 4—4 of Figure 3 and looking in the direction of the arrows.

Figure 5 is a fragmentary plan view of still another modified form of my invention, part of the molded composition being also broken away.

Figure 6 is a sectional view taken substantially on the line 6—6 of Figure 5.

Figure 7 is a fragmentary plan view of a modified reenforcing and frame construction suitable for use in the peripheral portion of the framework of my improved steering wheel.

Figure 8 is a view similar to Figure 7 of still another manner in which the peripheral reenforcing member may be formed and assembled, showing my preferred manner of joining the spokes thereto.

Figure 9 is a fragmentary perspective view of still another modified peripheral reenforcement construction.

Figure 10 is a view similar to Figure 9 showing another modified peripheral reenforcement construction.

Figure 11 is a fragmentary plan view of a modified steering wheel construction embodying the principles of my invention and usable either with or without a molded coating, and Figure 12 is a sectional view taken substantially on the line 12—12 of Figure 11 and looking in the direction of the arrows.

Referring now to the drawings: The framework shown in Figure 1 may be formed of either flat, round, half round, square, or any desired form of wire, of any suitable gauge, depending upon the size of the wheel and the strength desired. The outer frame and reenforcing member may be a simple annulus 15. Each spoke is composed of a group of three wires disposed in a triangular self-supporting arrangement, the wires 16 being disposed above the wire 17, as shown in Figures 1 and 2. The wires 16 may be continued around the periphery of the wheel within and directly beside the ring 15, as shown in Figure 1. This portion is designated 18 and is formed as a continuation of two of the wires 16 which are integral with its ends and which form part of the framework of two adjacent spokes. It will be seen that in this fashion, although eight portions 16 are embodied in the construction shown in Figure 1, they are all formed of but four lengths of wire, while the outer peripheral frame is doubled throughout its entire annular extent by the extension therebeside of the four portions 18. If desired also, the outer ring 15 may be omitted, enabling formation of the wheel and all four spokes of but four lengths of wire, except for the bracing spoke wires 17, which also may be omitted, however, if the wires 16—18 are sufficiently heavy. If a three spoke wheel is built in the same manner, only three lengths of wire need be used. In such case it would be obvious that each length of wire would form one third the periphery and one half of each of two of the spokes.

The lower bracing wires 17 of the spokes may be formed as individual lengths, and the entire assemblage may be secured together by welding at desired points. Suitable welding points are indicated in Figures 1 and 2 by the Figure 19. The hub may be formed as a hollow sheet metal stamping, designated 20, suitably peripherally apertured for insertion of the spoke wires 16 and 17, which may be welded thereto. The entire metallic framework may be molded or otherwise suitably embedded in any form of initially plastic moldable composition. Many of these are known and obtainable on the open market.

The composition forms no part of my invention. The molded enclosing mass is designated 21 in Figures 1 and 2.

In Figure 3 a somewhat modified three-spoke construction is shown in which the ring portion of the framework comprises a single wire or bar 15'. This may be made of wavular or other suitable irregular contour if desired, to assist in supporting the molded coating. In this construction the spoke wires may terminate at the ring and be welded thereto, as at 19'. The spoke wires corresponding to those designated 16 and 17 in the first described embodiment are here designated 16' and 17', and will be seen to be similarly arranged, but spaced relatively farther from each other. The hub 20' may be formed with a peripheral slot or slots 22 of substantially the same width as the spoke wires 16', which may be formed as shown in Figure 3. The wires are inserted in such slots as shown in Figures 3 and 4, each two adjacent spoke wires 16' being here also formed of a single length of wire. If desired the hub may be cut out rather than slotted. The wires 17' may be projected into suitable apertures arranged beneath the slots 22 in the hub 20', in the same manner as the wires 17 in the previous embodiment.

If desired, when the wheel construction shown in Figures 3 and 4 is used, the molded composition may be applied only to the ring 15' and the hub, or to the ring alone, and the spoke wires 16' and 17', otherwise bare, may be plated, enameled or given any other desired finish. If the hub portion is not covered with molded composition it may be finished by enclosing it in a stamped sheet metal shell, or in any other suitable manner.

In Figure 5 is shown a somewhat modified peripheral framework construction formed of flat wire or strips, and in which the framework of each spoke may comprise three individual wires arranged similarly to those shown in Figures 1 and 2 and welded to the inner ring member 18", as shown in Figure 6. The outer peripheral frame member is designated 15", being crenelated as shown in Figure 5, and spot-welded to the inner ring, as at the points designated 19". The spoke wires are designated 16" and 17", the numbers corresponding to those used in the previously described embodiments. The member 15" may be omitted if desired. When used it serves mainly as an additional support for the molded covering, which fills the spaces 23 as well as all crevices and interstices between the wires and strips, and is thus very firmly bonded to the wheel. The hub 20" may be of similar construction to the hub designated 20 in Figures 1 and 2, while the spoke wires are shown in closely grouped arrangement and covered by molded composition, also somewhat as in the first embodiment. It will be observed, however that the spoke and frame arrangements might easily be interchanged, and that the more widely spaced plated or enameled spokes above described in connection with Figures 3 and 4 might equally well be used with the wheel construction shown in Figures 5 and 6, and vice versa.

It will also be seen that the annular reenforcing framework may be varied in construction as desired. Various modifications are shown in Figures 7, 8, 9, and 10. Figures 7 and 8 show frame constructions built up of crenelated flat wire strips designated $15^3$—$18^3$ and $15^4$—$18^4$. In Figure 7 the crenelated strips are directly welded together, as at $19^3$. As shown in Figure 8, however, a separate flat strip, as 24, may be interposed, to which the crenelated strips $15^4$ and $18^4$ may be welded, as at the points $19^4$. In the latter view a spoke construction similar to that shown in Figures 5 and 6 is fragmentarily shown, the wires $16^4$ being welded at their ends to the strip $18^4$, while the wires $17^4$ may be welded to both the strips $15^4$ and 24.

Figures 11 and 12 show a modified steering wheel construction embodying the principles of my invention and which may be used, where extreme lightness is desired, without any molded or other coating whatever. The arrangement of the peripheral reenforcing members is such as to provide a wheel of great strength and rigidity despite its lightness, and they are preferably made of a size to form a wheel of such dimensions as to be easily grasped and used without the initially plastic coating such as I have shown in the previously described constructions. The wavular form of the strip $18^6$ provides finger grips on the inside of the wheel in the most convenient position, as will be apparent, and the strips $15^6$ and $18^6$ may be partly rounded, at least at their edges (as shown in Figure 12), so that the wheel will feel practically as smooth and comfortable to the hand of the user as do the wheels provided with composition coatings. In the further interest of lightness a bare frame spoke construction similar to that shown in Figures 3 and 4 may also be used, as shown in Figure 11; and the rugged yet extremely light weight wheel thus produced will be seen to be especially adaptable to aircraft use, although reduction of weight is also desirable in most vehicles. The space between the crenelations of the member $24^6$ of Figure 11, and this central strip itself, might be filled and covered with an initially plastic composition if desired, in which case less would be required, and the strips $18^6$ and $15^6$ would provide metallic inner and outer surfaces for the wheel.

Riveting rather than welding may of course be employed, if desired, for securing together the various parts of any of my improved frame constructions, or, as shown in Figure 9, the various frame parts may be secured together by integral lugs or tabs formed upon adjacent parts and adapted to be bent over to secure them together. As shown in Figure 9 the inner reenforcing member may comprise a simple crenelated strip $15^5$, while outer and inner annular strips may be secured thereto by tabs 25.

Wire, waxed hemp, or other such binding means may also be employed to secure the various frame parts together (as shown at 28 in Figure 10), and the application and hardening of the molded coating will render the structure approximately as strong and rigid as if welding were used as the securing means.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In a reenforced wheel construction, a hub comprising generally concentric ring elements, the outer only of which is provided with openings having portions grouped in generally triangular arrangement, spoke elements secured in and projecting from said openings and similarly grouped in generally triangular arrangement, the spoke elements of each group converging to a point of meeting and the points of meeting of the several groups lying on a common circle concentric with the hub, at least one of said spoke elements of each group projecting beyond the rest, each group including two upper elements and one lower element, the upper openings being elongated to provide corresponding portions in adjacent groups and the upper elements being continued through such elongated openings in the outer ring portion of the hub and from the same to form similar elements of different groups, and a generally circular rim element secured to the projecting ends of said spoke elements and securing said ends together.

2. In a reenforced wheel construction, a hub comprising a pair of concentric tubular elements the outer of which is provided with generally radial openings arranged in groups of three, the openings of each group being disposed in generally triangular relation, a spoke element projecting from each of said openings, the spoke elements of each group converging to points of meeting and securance lying on a common circle concentric with the hub, certain of said openings being extended circumferentially and common to two groups, one of said spoke elements of each of the groups being carried through one of said extended openings and continued beyond the same to project at opposite ends from different portions lying in different triangular groups, and a common devious and generally circular rim element secured to the side of said extended spoke element and to the ends of the other spoke elements, and tying said convergent ends.

GRÉGOIRE JOSEPH PANNECOUCKE.